United States Patent [19]

O'Lenick, Jr.

[11] Patent Number: 5,070,168

[45] Date of Patent: Dec. 3, 1991

[54] ETHER AMINE FUNCTIONAL SILICONE POLYMERS

[75] Inventor: Anthony J. O'Lenick, Jr., Lilburn, Ga.

[73] Assignee: Siltech Inc., Norcross, Ga.

[21] Appl. No.: 567,613

[22] Filed: Aug. 15, 1990

Related U.S. Application Data

[63] Continuation-in-part of Ser. No. 448,308, Jan. 11, 1989, Pat. No. 4,973,643.

[51] Int. Cl.$^5$ ............................................. C08G 77/00
[52] U.S. Cl. ...................................... 528/10; 525/474; 528/15; 528/31; 528/28; 528/26; 528/14; 528/27; 427/387
[58] Field of Search ..................... 528/15, 31, 28, 26, 528/14, 10, 27; 525/474; 427/387

[56] References Cited

U.S. PATENT DOCUMENTS 4,680,366 7/1987 Tanaka et al. ...................... 556/413
5,010,115 4/1991 Grisoni ................................. 528/15

Primary Examiner—Melvyn I. Marquis
Assistant Examiner—Karen A. Hellender

[57] ABSTRACT

The invention disclosed novel amino functional silicone polymers which have an ether amino pendant group. Compounds of the invention by virtue of their ether amino group, deposition on the surface of substrates, either alone or as complexes with cations, thereby altering the substrate's surface physical properties. The desirable durable properties which can be given to substrates include: softness, lubrication, soil release, and hydrophobicity. The compounds of the present invention are prepared by introduction of an amino group onto the silicone pendant group. Cyanoethylation followed by hydrogenation or reaction with ethylenimine or propylenimine of a hydroxy containing silicone polymer, or hydroxy containing vinyl intermediate which is subsequently introduced into the polymer backbone by hydrosilation are the preferred methods of preparation.

4 Claims, No Drawings

ETHER AMINE FUNCTIONAL SILICONE POLYMERS

RELATED APPLICATION

This application is a continuation-in-part of U.S. Ser. No. 07/448,308 filed 1/11/1989, now U.S. Pat. No. 4,973,643 issued 11/27/1990.

BACKGROUND OF THE INVENTION (1) Field of Invention

The present invention relates to a series of novel ether amino functional silicone polymer compounds, which are substantive to various substrate surfaces. The compounds when applied provide softness, antistatic properties, lubrication, soil release, and hydrophobicity. The reaction of hydroxyl containing silicone polymers with a suitable aminating agent results in these novel compounds. When an alkoxylated hydroxy compound is reacted, a series of products ranging in water/oil solubility can be prepared. This ability to vary molecules allows outstanding flexibility in performance characteristics.

(2) Object of the Invention

It is one of the objects of the present invention to provide a series of novel ether amino functional silicone polymers. These compounds are substantive to the surface of a fibrous, plastic or cellulosic material.

It is another objective of the current invention to provide ether amino silicone polymers which can be formulated into textile and laundry compositions to give antistatic, softness and lubrication properties to the garments or fabric treated. The superior antistatic properties are an important benefit, since this is a major aspect of consumer perception of softness in consumer and industrial laundry applications. Lubrication has been a property which is purported to effect garment life. Application of the compounds of the invention can be from solvent, aqueous dispersion or solution, or applied neat in these processes.

Still another object of the present invention is to provide a series of products which have differing solubilities in water and organic solvents. This is achieved by selection of the hydroxyl silicon raw material. Hydroxy silicone compounds suitable as raw materials for this invention are well known in the art, and are sold under several trade names. The silicone polymer can contain varying amounts of ethylene oxide, propylene oxide or butylene oxide or mixtures thereof. Introduction of the oxide into the molecule results in an inverse cloud point property. Inverse cloud point phenomenon are well known to those skilled in the art of nonionic surface active agents. The inverse cloud point is defined as a temperature above which the polymer has minimal solubility in water. The point at which the polymer has minimal water solubility is the same point at which it has maximum substantivity to a substrate.

(3) Description of the Arts and Practices

Silicone compounds have been known to be active at the surface of plastic, cellulosic and synthetic fibers as well as paper. They are nondurable lubricants and are very stable to oxidation, however, their high cost and lack of efficiency at low concentrations have made their acceptance in commercial products quite low.

The low efficiency and low durability of polydimethylsiloxane is due to the fact that it is very water insoluble. Simply, the silicone oil delivery to the surface of the fabric is by hydrophobic binding. Since the polydimethylsiloxane is not chemically bonded to the fiber, the lubrication effect is very transient and disappears with one washing. In addition, since there is no reaction of the polydimethylsiloxane to the surface of the fiber, a very low percentage of silicone is actually deposited. A large amount of the expensive silicone goes down the drain with the waste water.

Many attempts have been made to overcome these problems and get a truly substantive product, which deposits efficiently. One approach has been to use hydrosilation technology to make alkoxylated silicone polymers, used as raw materials in this invention. These materials do not have the substantivity desired to make them suitable for use as antistats, softeners and or soil release agents. Hydrosilation technology is known to those skilled in the art and is outlined in U.S. Pat. No. 4,083,856. These materials, prepared by the hydrosilation of a vinyl alkoxylated alcohol and a silanic hydrogen containing polymer, by virtue of their alkoxylation, exhibit a high cloud point classically seen in nonionics, which is a point were at some elevated temperature, the silicone polymer comes out of solution and becomes more substantive to the hydrophobic substrate. This approach allows for better efficiencies but does little if anything for long term substantivity.

U.S. Pat. No. 3,511,699 to Sterman issued May 12, 1970 teaches that epoxy compounds placed in the silicone backbone by hydrosilation can be cured onto certain fibers to give improved substantivity. The hydroxyl groups on the cellulosic fiber and the epoxy group in the silicone polymer react, resulting in a ether linkage. While this technique is a definite improvement over prior art compounds, their cost, efficiency and durability made their acceptance and commercial use minimal.

Amino silicone compounds are known in the art. Such compounds are described in U.S. Pat. No. 4,476,188 to Blizzard, however Blizzard states (col. 1. line 32), "By amine functional silicone it is meant herein a polyorganosiloxane subsistent with at least one alkyl radical bearing at least one amino group. Said alkyl radical is bonded to a silicone atom by a Si-C bond. The term aminofunctional silicone as used herein is intended to encompass silicones having alkyl radicals bearing one or more amino group." Blizzard states that the amino group is alkyl (CmH2m)n-NH2 in col. 4 line 67.

Another reference is that of Pike Canadian Patent 606,697, which states in col. 1 lines 14–22 "This invention relates in general to the synthesis of organopolysiloxanes. More particularly, this invention is concerned with the production of end blocked organopolysiloxanes containing, among other siloxane units, aminoalkylalkylsiloxane or aminoalkylaryl siloxane units in which the amino group is linked to the silicone atom thereof through a polymethylene chain of at least three carbon atoms."

Finally, U.S. Pat. No. 2,947,771 to Bailey, which is related to the above mentioned Canadian Patent, teaches the use of some aminoalkylalkylsiloxane or aminoalkylaryl siloxane units in which the amino group is linked to the silicone atom thereof through a polymethylene chain. This is clearly shown in the structure (Col. 1 lines 43–46)

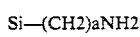

The compounds of the present invention are ether amines. The introduction of the ether function results in enhanced water solubility and better substantivity.

THE INVENTION

Summary of the Invention

The present invention relates to novel silicone polymer compounds which have an ether amino pendant functional group present. The polymers by virtue of the pendent group deposit on substrate surfaces and form effective surface modifying finishes. The compounds of the present invention are substantive to cellulosic and synthetic fibers as well as metal surfaces and plastic polymers.

The compounds of this invention having a pendant amino group is represented by the following formula;

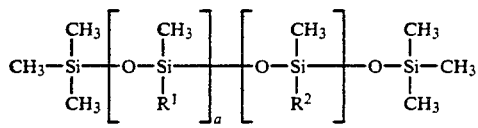

a is an integer from 1 to 200;
b is an integer from 1 to 200;
$R^1$ is selected from $-(CH_2)_nCH_3$ and phenyl;
n is an integer from 0 to 10;
$R^2$ is $-(CH_2)_3-(OCH_2CH_2)_x-(OCH_2CH(CH_3))_y-(OCH_2CH_2)_z-R^3$;
x, y and z are integers and are independently selected from 0 to 20;
$R^3$ is selected from $-OCH_2CH_2NH_2$; $-OCH_2CH(CH_3)-NH_2$; and $-O(CH_2)_3-N(H)-[(CH_2)_3-N(H)]_m-H$;
m is an integer from 0 to 10.

In a preferred embodiment, the ether amines are derived from alkoxylated amines. That is x+y+z are greater than zero. This results in superior water solubility and an inverse cloud point phenomenon. The preferred embodiment is described by the definition;

$R^2$ is
$-(CH_2)_3-(OCH_2CH_2)_x-(OCH_2CH(CH_3))_y-(OCH_2CH_2)_z-R^3$;

x, y and z are integers and are independently selected from 0 to 20 with the proviso that x+y+z are greater than zero.

An even more preferred species is when x+y+z is greater than 3.

The products of the present invention are prepared by reaction of a hydroxyl containing silicone polymer with a suitable aminating reagent. One method of placing preparing the reactive hydroxyl containing silicone polymer is to react a silanic hydrogen containing polymer with allyl alcohol or an allyl alcohol alkoxylate. Procedures of this reaction are well known to those skilled in the art. U.S. Pat. No. 4,083,856 describe suitable processes.

The present invention teaches a process for treating fiber which comprises contacting the fiber with a conditioning amount of a silicone polymer which conforms to the following structure;

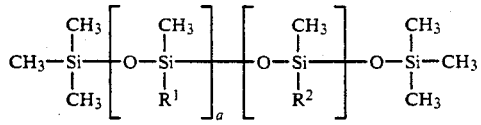

a is an integer from 1 to 200;
b is an integer from 1 to 200;
$R^1$ is selected from $-(CH_2)_nCH_3$ or phenyl;
n is an integer from 0 to 10;
$R^2$ is $-(CH_2)_3-(OCH_2CH_2)_x-(OCH_2CH(CH_3))_y-(OCH_2CH_2)_z-R^3$;
x, y and z are integers and are independently selected from 0 to 20;
$R^3$ is selected from $-OCH_2CH_2NH_2$, $-OCH_2CH(CH_3)-NH_2$; or $-O(CH_2)_3-N(H)-[(CH_2)_3-N(H)]_m-H$;
m is an integer from 0 to 10.

In another preferred embodiment the process is conducted with a silicone polymer conforms to the following structure;

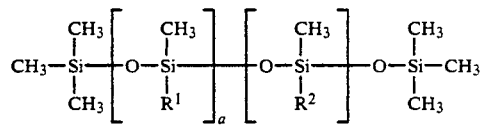

a is an integer from 1 to 200;
b is an integer from 1 to 200;
$R^1$ is selected from $-(CH_2)_nCH_3$ or phenyl;
n is an integer from 0 to 10;
$R^2$ is $-(CH_2)_3-(OCH_2CH_2)_x-(OCH_2CH(CH_3))_y-(OCH_2CH_2)_z-R^3$;
x, y and z are integers and are independently selected from 0 to 20;
$R^3$ is $-OCH_2CH(CH_3)NH_2$.

In still another preferred embodiment the process is conducted using a silicone polymer which conforms to the following structure;

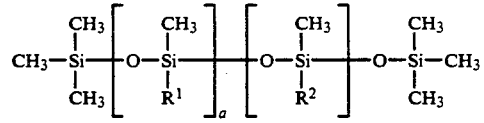

a is an integer from 1 to 200;
b is an integer from 1 to 200;
$R^1$ is selected from $-(CH_2)_nCH_3$ or phenyl;
n is an integer from 0 to 10;
$R^2$ is $-(CH_2)_3-(OCH_2CH_2)_x-(OCH_2CH(CH_3))_y-(OCH_2CH_2)_z-R^3$;
x, y and z are integers and are independently selected from 0 to 20;
$R^3$ is $-O(CH_2)_3-N(H)-[(CH_2)_3-N(H)]_m-H$;
m is an integer from 0 to 10.

In a final preferred embodiment the process is conducted using a silicone polymer which conforms to the following structure;

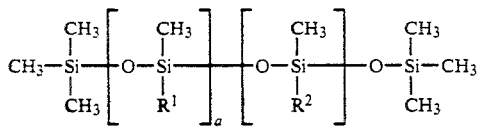

a is an integer from 1 to 200;
b is an integer from 1 to 200;
$R^1$ is selected from —$(CH_2)_nCH_3$ and phenyl;
n is an integer from 0 to 10;
$R^2$ is —$(CH_2)_3$—$(OCH_2CH_2)_x$—$(OCH_2CH(CH_3))_y$—$(OCH_2CH_2)_z$—$R^3$;
x, y and z are integers and are independently selected from 0 to 20;
$R^3$ is —O—$CH_2CH_2$—$NH_2$.

EXAMPLES

Vinyl Intermediate Compounds

Compounds of this class are prepared by alkoxylation of allyl alcohol using methods well known to those skilled in the art. The following are some of the many compounds which can be used to make the products of this invention.

$CH_2$=CH—$CH_2$—O—$(CH_2$—$CH_2$—O$)_x$-$(CH_2$—$CH(CH_3)$—O$)_y$-$(CH_2$—$CH_2$—O$)_z$-H

| Designation | x | y | x | Molecular Weight |
|---|---|---|---|---|
| A | 3 | 0 | 0 | 189 |
| B | 9 | 27 | 3 | 2,178 |
| C | 11 | 3 | 0 | 718 |
| D | 0 | 0 | 0 | 57 |
| E | 20 | 20 | 20 | 2,940 |
| F | 20 | 0 | 0 | 880 |
| G | 10 | 10 | 10 | 1,470 |

Preparation of Intermediates

Silicone intermediates of the type used to make the compounds of this invention are well known to those skilled in the art. International Publication (*Silicone Alkylene Oxide Copolymers As Foam Control Agents*) WO 86/0541 by Paul Austin (Sept. 25, 1986) p. 16 (examples 1 to 6) teaches how to make the following intermediates, and is incorporated herein by reference.

Hydrosilation of Intermediates

Silanic Hydrogen Containing Compounds

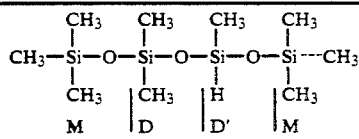

Group Designations

| Example | The Austin Example | Group Designation | Average Molecular Weight | Equivalent Molecular Weight |
|---|---|---|---|---|
| 1 | 1 | $MD_{20}D'_{3.2}M$ | 1,850 | 551 |
| 2 | 4 | $MD_{160}D'_5M$ | 24,158 | 4,831 |
| 3 | 6 | $MD_{20}D'_{10}M$ | 2,258 | 225 |

Hydrosilation Compounds

The hydrosilation reaction used to make the compounds of this invention are well known to those skilled in the art Reference; International Publication (*Silicone Alkylene Oxide Copolymers As Foam Control Agents*) WO 86/0541 by Paul Austin (Sept. 25, 1986) p.19.

EXAMPLE 4

To a 22 liter three necked round bottom flask fitted with a mechanical agitator, thermometer with a Thermo-watch temperature regulator, nitrogen sparge tube vented relfux condenser and heating mantle is added 189.0 grams of Vinyl Intermediate Example #A. Next add 225 grams of Silanic Hydrogen Containing Compound Example #3 and 3,000 grams of toulene. Heat to 115 C. to azeotropically remove any water and 200 ml of toluene. The temperature is reduced to 85 C. and 3.5 ml or 3% pt as $H_2PtCl_6$ in ethanol is added. Light is then excluded from the flask by covering it with a black cloth. An exotherm is noted to about 95 C., while the contents are stirred for about 2 hours. During this time silanic hydrogen concentration drops to nil. Cool to 65 C. and slowly add 60 g of sodium bicarbonate. Allow to mix overnight and filter through a 4 micron pad. Distill off any toluene at 100 C. and 1 torr.

EXAMPLES 4-10

The above procedure is repeated, only this time replacing both the silanic hydrogen compound #3 with the specified number of grams of the specified silanic hydrogen compound and the vinyl intermediate example A with the specified number of grams of the specified vinyl intermediate.

| Example | Vinyl Intermediate Example | Grams | Silanic Hydrogen Compound Example | Grams |
|---|---|---|---|---|
| 4 | A | 189.0 | 1 | 551.0 |
| 5 | B | 2,178.0 | 2 | 4,831.0 |
| 6 | C | 718.0 | 3 | 225.0 |
| 7 | D | 57.0 | 1 | 551.0 |
| 8 | E | 2,940.0 | 2 | 4,831.0 |
| 9 | F | 880.0 | 3 | 225.0 |
| 10 | G | 1,470.0 | 1 | 551.0 |

Cyanoethylation

The silicone ether amine compounds of this invention can be prepared using the process disclosed in U.S. Pat. No. 3,404,165. Hydroxyl containing silicone compounds, previously described, are reacted with acrylonitrile or methacrylonitrile, replacing the fatty alcohols used in the reference patent.

The preparation of the novel silicone ether amines of this invention from the hydroxy silicone compounds can be illustrated by the following reaction in which R is the hydroxy silicone compound conforming to the following structure;

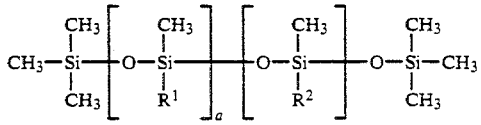

a is an integer from 1 to 200;
b is an integer from 1 to 200;
$R^1$ is selected from —$(CH_2)_nCH_3$ and phenyl;
n is an integer from 0 to 10;

$R^2$ is —$(CH_2)_3$—$(OCH_2CH_2)_x$—$(OCH_2CH(CH_3))_y$—$(OCH_2CH_2)_z$—$R^3$;

x, y and z are integers and are independently selected from 0 to 20;

$R^3$ is —OH.

Cyanoethylation Reaction Sequence

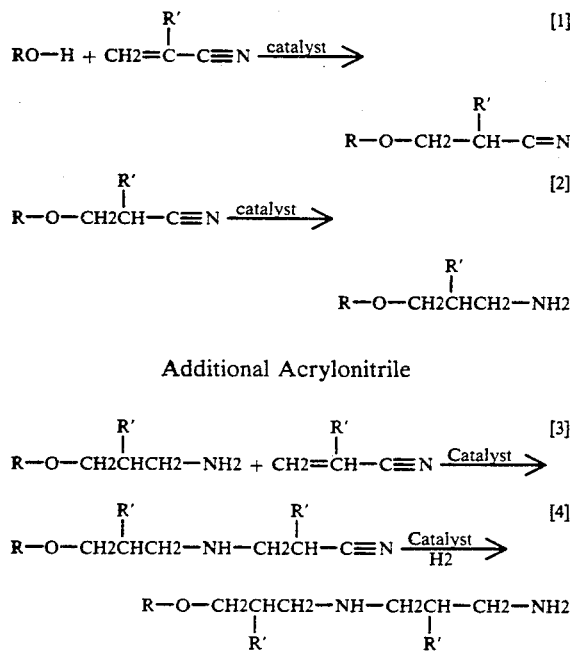

Additional Acrylonitrile

In preparing the silicone ether nitriles according to Reaction 1 above, the hydroxy silicone compound and acrylonitrile (or methacrylonitrile) are reacted in stiochiometric amounts (preferably with 2 to 5 percent excess of the acrylonitrile) in the presence of a soluble alkaline catalyst such as a metal alkoxylate, e.g., sodium methoxide, potassium methoxide, sodium ethoxide, potassium ethoxide, and the like, or oxides and hydroxides of those metals soluble in hydroxy silicones such as sodium methoxide, potassium methoxide, sodium hydroxide and potassium hydroxide. The catalyst may be introduced into the reaction mixture per se, or they may be formed in the reaction mixture in situ, the amount of catalyst being present in the amount of 0.005 to one percent of the total weight of the reactants. Generally, this reaction will be carried out at a temperature in the range of 30-100 C., using atmospheric or autogenous pressure. The resulting reaction mixture, containing the silicone ether nitrile, can be treated to recover this latter product for subsequent hydrogenation. In a preferred case the product can be directly hydrogenated. This hydrogenation reaction illustrated by Reaction 2 above, can be carried out, for example, at a temperature in the range of 70-175 C. and pressures in the range from atmospheric pressure up to as much as 250 atmospheres of hydrogen (and 1 to 25% ammonia by weight of the reaction mixture) using such hydrogenation catalysts as nickel, copper, cobalt, palladium metal or oxide, platinum metal or oxide and chromium oxide, though the preferred catalyst is Raney nickel. Following completion of the hydrogenation reaction, low molecular weight volatile materials such as ammonia and water aspirator, to recover the silicone ether amine product. This latter product is then reacted with acylonitrile (or methacrylonitrile), preferably with 2 to 5 percent stiochiometric excess of the latter, as shown in Reaction 3. This latter reaction is preferably carried out in the presence of a catalytic amount of an acid catalyst, e.g., 0.005 to one percent acetic acid, based on the total weight of reactants, at temperature and pressure conditions like that of Reaction 1. The hydrogenation of the resulting silicone ether amine nitrile, Reaction 4, is then carried out in the manner of Reaction 2 and the resulting novel silicone ether amine is used without additional purification.

The following examples further illustrate the objects and advantages of this invention, though it should be understood that the various reactants and amounts thereof, reaction conditions, and other details are merely illustrative and should not be construed to unduly limit this invention.

GENERAL PROCEDURE

The specified amount of hydroxy silicone compound (Examples 4-10) is added to an autoclave with 0.3% of metallic sodium. The specified amount of acrylonitrile is charged to the autoclave over a 30 min. period. It is noteworthy that the reaction sequence of acrylonitrile reaction followed by hydrogenation is repeated until the desired number of moles of acrylonitrile have been added. The exothermic reaction raises the temperature of the mixture to 65-70 C., and after 1 hr. of reaction the mixture cooled to 35 C. and neutralized with glacial acetic acid (to neutralize sodium derivatives). The resulting reaction mixture is then hydrogenated in the presence of 2% of Raney nickel for about 7 hrs. at a hydrogen pressure of 500 p.s.i.g. and at about 300 F. The resulting reaction product can then reacted with additional acrylonitrile over about a 4 hr. period, producing a compounds having more acrylonitrile reacted with the molecule. The nitrile is then hydrogenated after being purged with hydrogen and pressured to 80 p.s.i.g. with ammonia. The reaction mixture is then heated to about 300 F. under 550 p.s.i.g. hydrogen pressure over about a period of 2 hrs.

One Mole Added Acrylonitrile

| Example | Hydroxy Silicone Example | Grams | Acrylonitrile Grams |
|---|---|---|---|
| 11 | 4 | 740.0 | 56.0 |
| 12 | 5 | 7009.0 | 56.0 |
| 13 | 6 | 943.0 | 56.0 |
| 14 | 7 | 608.0 | 56.0 |
| 15 | 8 | 7771.0 | 56.0 |
| 16 | 9 | 1105.0 | 56.0 |
| 17 | 10 | 2021.0 | 56.0 |

Two Mole Acrylonitrile

| Example | Hydroxy Silicone Example | Grams | Acrylonitrile Grams |
|---|---|---|---|
| 18 | 11 | 798.0 | 56.0 |
| 19 | 12 | 7067.0 | 56.0 |
| 20 | 13 | 1001.0 | 56.0 |
| 21 | 14 | 666.0 | 56.0 |
| 22 | 15 | 7829.0 | 56.0 |
| 23 | 16 | 1163.0 | 56.0 |
| 24 | 17 | 2079.0 | 56.0 |

Ethylenimine Reaction Sequence

Ethyleneimine is a known reactant. The reaction sequence used for the preparation of ether amines is as follows;

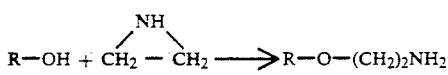  [5]

A similar sequence is observed with propylenimine;

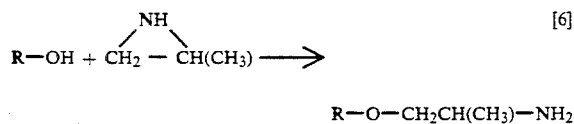  [6]

The reaction of the hydroxyl group on the silicone polymer with ethylene imine or propylene imine is accomplished using processes and procedures known to those skilled in the art.

The reaction can be conducted with an equimolar amount of the imine or with a slight excess which is removed under slight vacuum.

EXAMPLE

Into a suitable reaction vessel is placed the specified number of grams of hydroxy silicone examples 4-10. The specified amount of the specified imine is slowly added at a temperature of between 50 to 100 C. over a period of 4 to 6 hours. Hold at 100 C. for one hour after the addition. Once the hydroxyl value has become very small and the amine value approaches theoretical the reaction is stopped and the product is striped.

| Example | Hydroxy Silicone Example | Grams | Ethylenimine Grams |
|---|---|---|---|
| 25 | 4 | 740.0 | 45.0 |
| 26 | 5 | 7009.0 | 45.0 |
| 27 | 6 | 943.0 | 45.0 |
| 28 | 7 | 608.0 | 45.0 |
| 29 | 8 | 7771.0 | 45.0 |
| 30 | 9 | 1105.0 | 45.0 |
| 31 | 10 | 2021.0 | 45.0 |

| Example | Hydroxy Silicone Example | Grams | Propylenimine Grams |
|---|---|---|---|
| 25 | 4 | 740.0 | 60.0 |
| 26 | 5 | 7009.0 | 60.0 |
| 27 | 6 | 943.0 | 60.0 |
| 28 | 7 | 608.0 | 60.0 |
| 29 | 8 | 7771.0 | 60.0 |
| 30 | 9 | 1105.0 | 60.0 |
| 31 | 10 | 2021.0 | 60.0 |

Applications Evaluation

Softening

Compounds of this invention were compared to standard compounds commercially available for softness at 0.1% concentration. In order to evaluate the durability of the softener, the swatches which were cotton, polyester blends were washed in Ajax detergent with no softeners, 5 times as per label instructions and dried in a home drier. Softness was then reevaluated. The softness is rated on a 1-5 basis (5 being the most harsh).

Standard Compounds

| Compound | Type of Compound | Softness Rating 0 Wash | Softness Rating 5 Wash |
|---|---|---|---|
| Alkaquat DAET-90 | Amido Quat | 3 | 5 |
| Alkaquat T | Imidazoline Quat | 3 | 5 |
| Distearyl-dimethyl-ammoninum chloride | Diquat | 2 | 4 |

| Example | Type of Product | Softness Rating 0 Wash | Softness Rating 5 Wash |
|---|---|---|---|
| 12 | Compounds of this invention | 3 | 3 |
| 16 | Compounds of this invention | 3 | 3 |
| 21 | Compounds of this invention | 2 | 3 |
| 27 | Compounds of this invention | 2 | 4 |
| 30 | Compounds of this invention | 2 | 3 |

What is claimed:

1. A process for treating fiber which comprises contacting the fiber with a conditioning amount of a silicone polymer which conforms to the following structure;

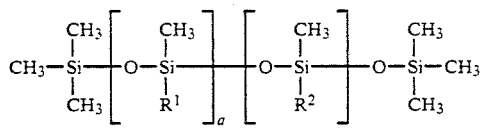

a is an integer from 1 to 200;
b is an integer from 1 to 200;
$R^1$ is selected from —$(CH_2)$ $nCH_3$ phenyl;
n is an integer from 0 to 10;
$R^2$ is —$(CH_2)_3$—$(OCH_2CH_2)_x$—$(OCH_2CH(CH_3))_y$—$(OCH_2CH_2)_z$—$R^3$;
x, y and z are integers and are independently selected from 0 to 20;
$R^3$ is selected from —$OCH_2CH_2NH_2$, —$OCH_2CH(CH_3)$—$NH_2$; or —$O(CH_2)_3$—$N(H)$—$[(CH_2)_{3-N(H)}]_m$—H;
m is an integer from 0 to 10.

2. A process of claim 1 which said silicone polymer conforms to the following structure;

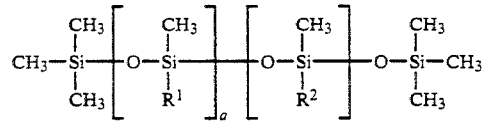

a is an integer from 1 to 200;
b is an integer from 1 to 200;
$R^1$ is selected from —$(CH_2)_nCH_3$ or phenyl;
n is an integer from 0 to 10;
$R^2$ is —$(CH_2)3$—$(OCH_2CH_2)_x$ —$(OCH_2CH(CH_3))_y$—$(OCH_2CH_2)_z$—$R^3$;
x, y and z are integers and are independently selected from 0 to 20;
$R^3$ is —O—$CH_2CH(CH_3)NH_2$.

3. A process of claim 1 in which said silicone polymer conforms to the following structure;

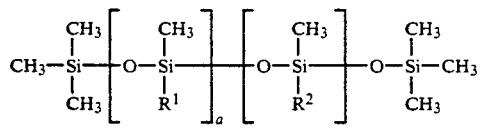

a is an integer from 1 to 200;
b is an integer from 1 to 200;
$R^1$ is selected from $-(CH_2)_nCH_3$ or phenyl;
n is an integer from 0 to 10;
$R^2$ is $-(CH_2)_3-(OCH_2CH_2)x-(OCH_2CH(CH_3))y-(OCH_2CH_2)z-R^3$;
x, y and z are integers and are independently selected from 0 to 20;
$R^3$ is $-O(CH_2)_3-N(H)-[(CH_2)_3-N(H)]_m-H$;
m is an integer from 0 to 10.

4. A process of claim 1 in which said silicone polymer conforms to the following structure;

a is an integer from 1 to 200;
b is an integer from 1 to 200;
$R^1$ is selected from $-(CH_2)_nCH_3$ or phenyl;
n is an integer from 0 to 10;
$R^2$ is $-(CH_2)_3-(OCH_2CH_2)x-(OCH_2CH(CH_3))y-(OCH_2CH_2)z-R^3$;
x, y and z are integers and are independently selected from 0 to 20;
$R^3$ is $-O-CH_2CH_2-NH_2$.

* * * * *